A. H. SEARLE AND O. DURYEA.
APPARATUS FOR FORMING BUCKET BODIES.
APPLICATION FILED JUNE 22, 1920.
Patented Apr. 26, 1921.
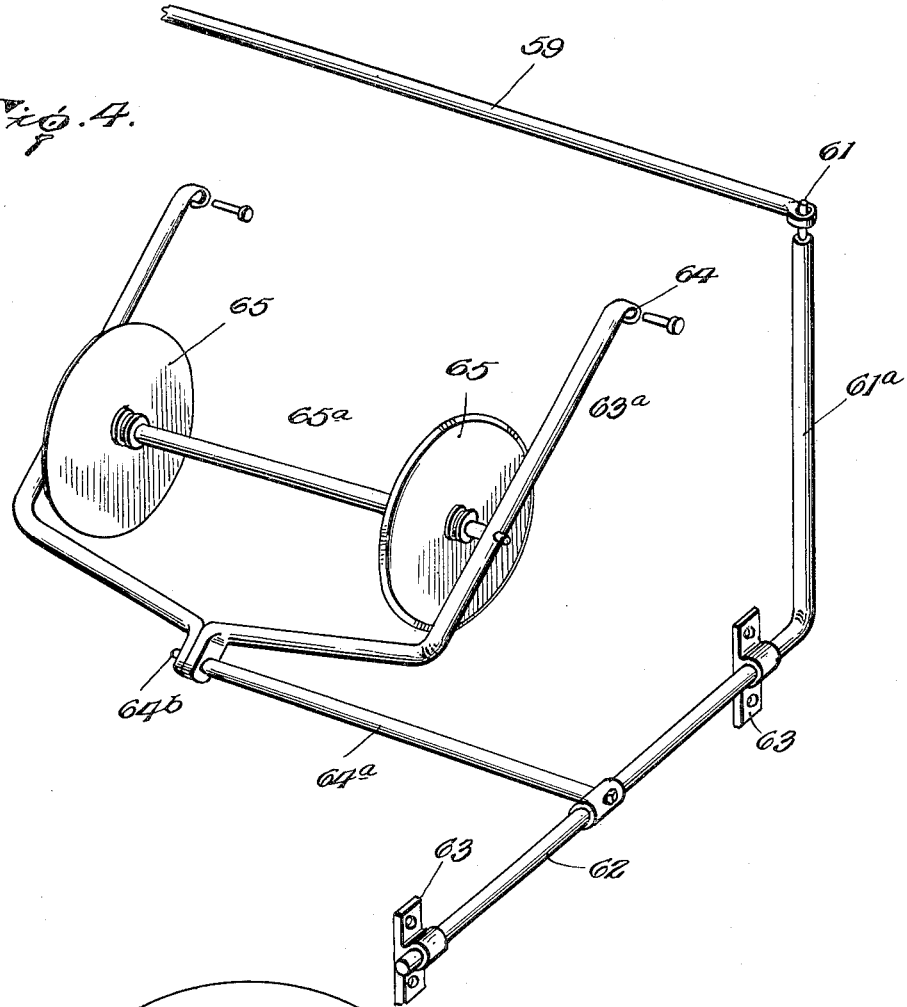
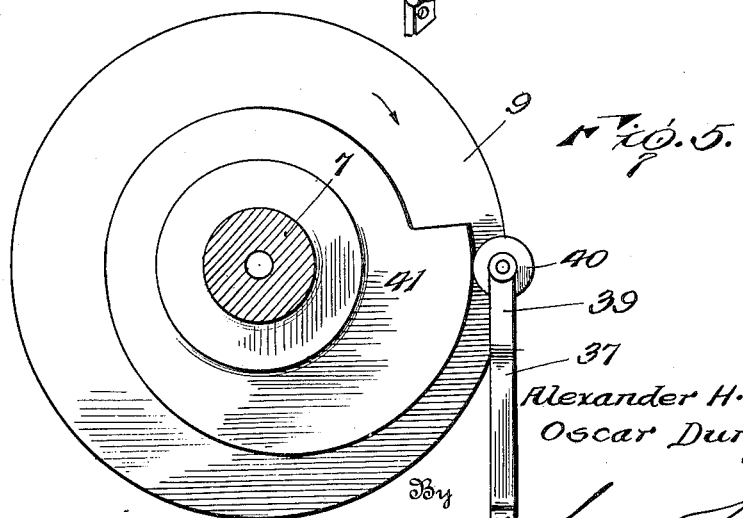
Inventors.
Alexander H. Searle
Oscar Duryea.
By
Lacey & Lacey, Attorneys

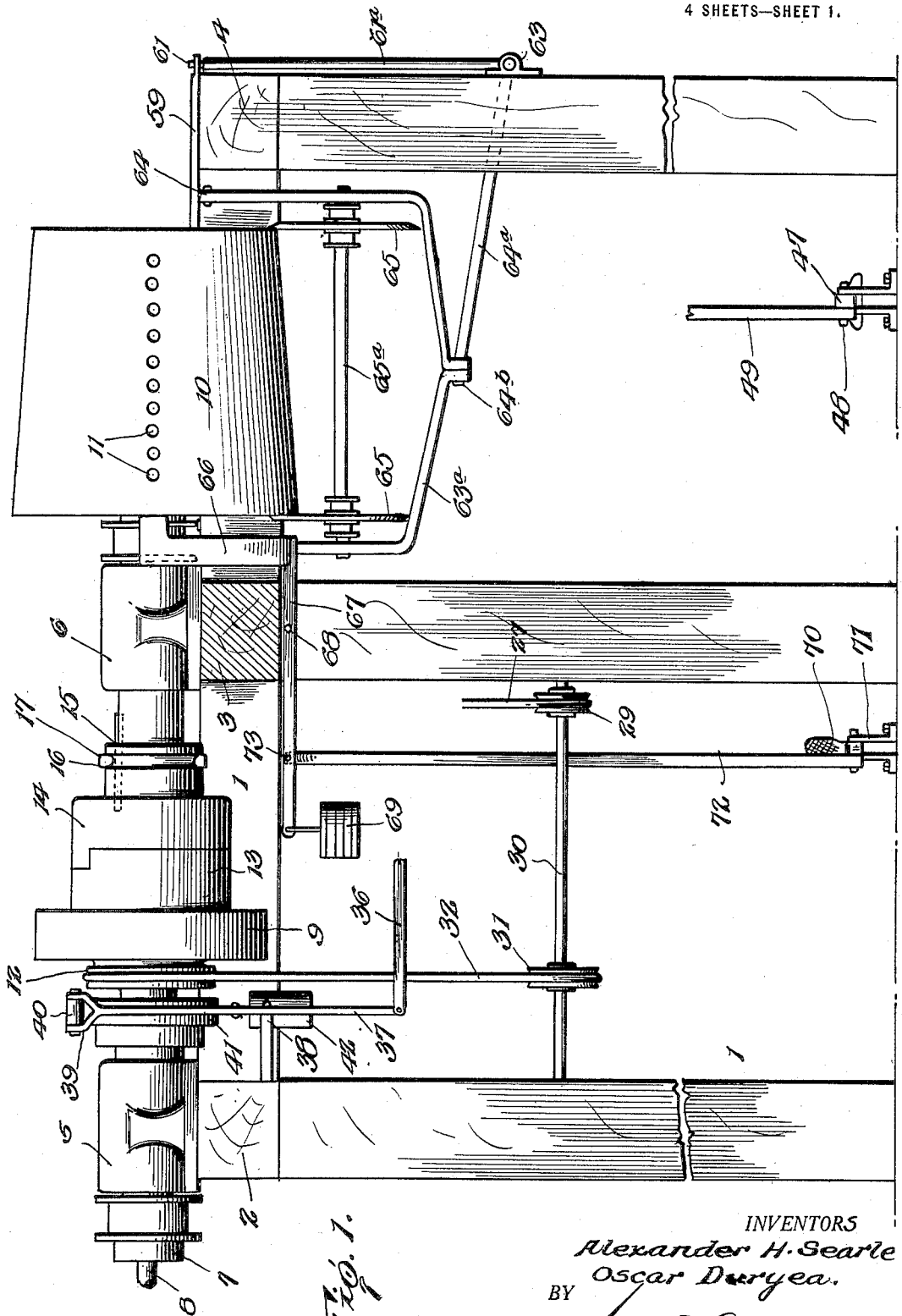

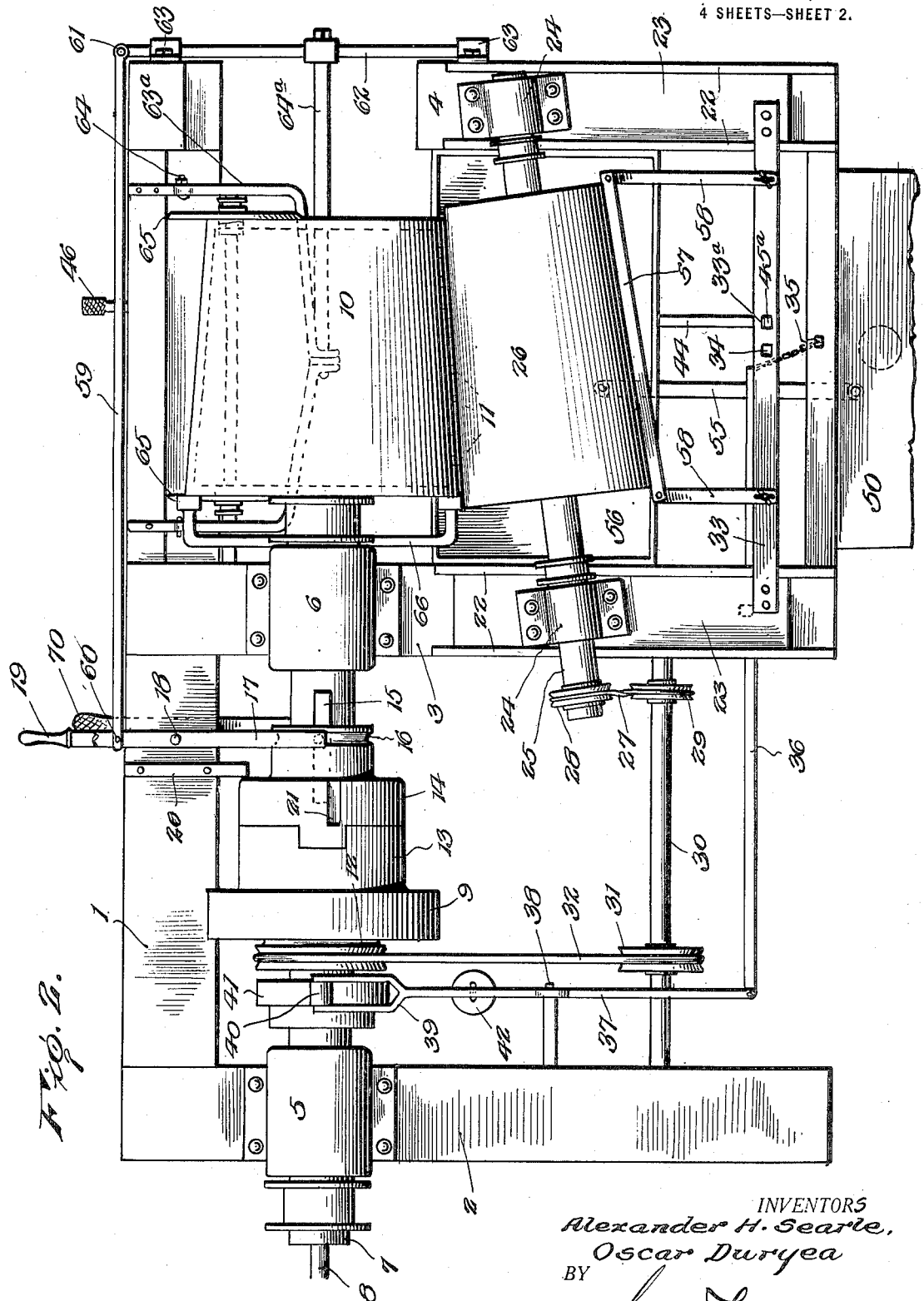

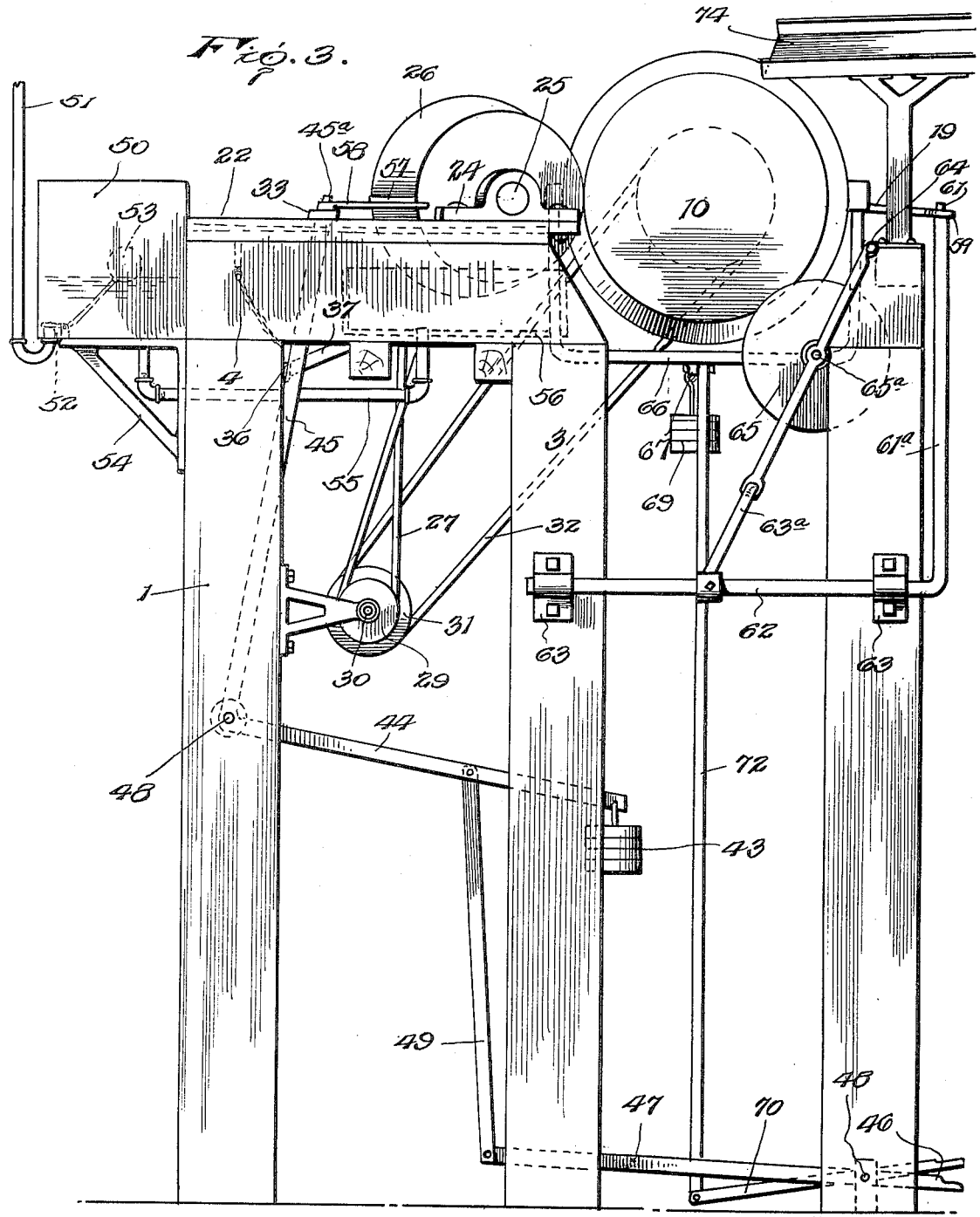

UNITED STATES PATENT OFFICE.

ALEXANDER H. SEARLE AND OSCAR DURYEA, OF BROOKLYN, NEW YORK.

APPARATUS FOR FORMING BUCKET-BODIES.

1,375,937. Specification of Letters Patent. Patented Apr. 26, 1921.

Application filed June 22, 1920. Serial No. 390,953.

*To all whom it may concern:*

Be it known that we, ALEXANDER H. SEARLE and OSCAR DURYEA, citizens of the United States, residing at Brooklyn, in the county of Kings and State of New York, have invented certain new and useful Improvements in Apparatus for Forming Bucket-Bodies, of which the following is a specification.

This invention relates to means for forming laminated container bodies such, for instance, as shells of pails and the like wherein it is desired to build up the body of the container by a series of laminations of relatively thin material whereby a rigid impervious container may be inexpensively formed.

The apparatus whereby the containers are formed is so constructed that the initial lamination, and which forms the interior surface of the container, is held to a mandrel by vacuum and the successive laminations are applied by a roller tangentially contacting with the laminations in the horizontal plane of the axis of the mandrel and rolling each lamination into place while, at the same time, applying adhesive to the surface of the lamination.

A feature of the apparatus resides in particular construction whereby a straight cut strip notched at suitable points to indicate separate laminations is applied to the mandrel and trimmed so that no ragged edges remain, thus obviating the necessity for using arcuate shaped lamination strips.

The invention also provides an apparatus, the operation of which cannot be discontinued except when the parts thereof reach a certain position ready for reoperation of the apparatus.

In the drawings:

Figure 1 is a rear elevation of the apparatus, the adhesive mandrel being removed;

Fig. 2 is a top plan view;

Fig. 3 is an end elevation;

Fig. 4 is a perspective view of the trimmer mechanism;

Fig. 5 is a detail of the cam operating the adhesive-applying roll.

In detail:

The apparatus, as herein shown, comprises a frame 1 having the cross pieces 2, 3 and 4. On the cross pieces 2 and 3 are mounted journal boxes 5 and 6 respectively which receive the power shaft 7 having a longitudinal passage therethrough which is connected with a pipe 8 leading to a suitable vacuum pump (not shown). The shaft 7 carries a pulley 9 for drive purposes at one end and at the other end it carries a hollow mandrel 10 having the configuration of the interior of the pail or other container which it is desired to form. The mandrel 10 is hollow and communicates with the interior of the drive shaft 7 so that a vacuum is maintained within the mandrel. A row of holes 11 is provided along the side of the mandrel to permit the suction or vacuum to hold the initial lamination against the mandrel body.

Fixed to one face of the pulley 9 is a grooved pulley 12, while on the opposite face of the driving pulley is a clutch member 13 for engagement by the jaw or clutch member 14 keyed, as at 15, to the shaft 7 and having the grooved hub 16 for engagement by the forked lever 17 pivoted at 18 on the frame 1 and having a handle 19 whereby the clutch member 14 may be slid into and out of engagement with the clutch member 13 and the driving pulley locked to or released from the power shaft. A lug 20 is fixed to the frame member 1 and coöperates with a recess 21 in the periphery of the clutch member 14 so that the said member may be disengaged from the clutch member 13 only at such time as the recess 21 registers with the lug 20, this recess being so positioned with respect to the row of holes in the mandrel 10 that the mandrel will always be stopped with the holes at the top. In this way the operator of the machine is always assured that when he stops his machine it is in the proper condition for resuming operation.

Mounted on the frame members 3 and 4 are the guides 22 which accommodate the slides 23 carrying bearings 24 receiving the angularly directed shaft 25 which carries an adhesive roll 26 driven by a belt 27 passing over pulleys 28, 29. The pulley 29 is carried by a countershaft 30 which also carries a pulley 31 connected by a belt 32 with the pulley 12. The arrangement of the countershaft 30 with respect to the shaft 25 is such that the driving relation continues regardless of the movement of the slides 23 which move the adhesive-applying roll 26 toward and away from the mandrel 10. The slides 23 are connected by a cross bar 33 provided with an aperture 34 adapted to be engaged by a catch or spring bolt having a flexible connection with and operated by the pivoted lever 36 through the medium of the rock lever 37 pivoted at 38 and provided with a forked end 39 having a roller 40 engaging with the cam 41 rotating with the shaft 7, and which cam is so shaped that it permits the catch 35 to be disengaged when the roller 40 falls onto the low part of the cam, a weight 42 hung on the lever 37 holding the roller against the cam at all times. When the catch is released the weight 43 on the end of the bell crank lever 44 swings said lever so that its arm 45, provided with a tongue 45$^a$ playing in an aperture 33$^a$ in the cross piece 33, moves the adhesive-applying roll 26 toward the mandrel 10. However, this action is timed by the cam 41 so that the adhesive-applying roll does not engage the mandrel 10 until the row of holes in the mandrel coincides with the point of tangency between the mandrel and the adhesive-applying roll thus avoiding the application of adhesive to the mandrel.

The adhesive-applying roll may be returned to its latched position by foot pressure on the end 46 of a foot lever 47 pivoted at 48 and also connected by the link 49 with the arm 44 of the bell crank lever. At the rear of the machine is mounted an adhesive reservoir 50 which is fed through a pipe 51 leading to a valve 52 operated by a float 53 so as to maintain a proper level of adhesive in the reservoir. Brackets 54 may be employed for supporting this reservoir. The reservoir 50 communicates through a pipe 55 with a pan 56 in which the adhesive roll dips, the level in the pan 56 being regulated by the level in the reservoir 50. A scraper 57 is mounted on arms 58 so as to bear against the adhesive-applying roll 26 and regulate the adhesive film carried thereby. It is to be noted that, in order to prevent drying of the adhesive film on the roll 26, said roll is driven at all times so that its surface continues to receive a fresh supply of adhesive. The scraper causes the film to be spread evenly on the surface of the roll and the arms 58 may be adjustably secured to the bar 33 so that, if desired, the thickness of the film may be varied according to different working conditions.

A rod 59 is pivoted at one end 60 to the lever 19 and at its opposite end loosely engages a tongue 61 at the end of the upright portion 61$^a$ of the shaft 62 which is journaled in bearings 63. A U-shaped bracket 63$^a$ pivoted at 64 carries disk cutters 65 on a shaft 65$^a$, said cutters being swung into and out of trimming position with respect to the mandrel 10 by means of a rod 64$^a$ having a tongue 64$^b$ engaging said U-shaped bracket as shown, said rod 64$^a$ being secured to the shaft 62.

A yoke 66 is located adjacent the large end of the mandrel 10 and is carried on one end of a lever 67 which is pivoted at 68 and equipped with a weight 69 at its opposite end. Normally the weight holds the yoke away from the bucket or container but pressure upon a foot pedal 70 fulcrumed upon a floor bracket 71 will lift a link 72 connecting said pedal with the lever 67 at 73 so that the yoke will be rocked against the end of the container and release the same from the mandrel.

The operation of the machine or apparatus is as follows:

In forming a bucket body, the machine is in condition for operation as regards the adjustment of its parts and adhesive is fed into the tank or pan 56 through the medium of the pipe 51, reservoir 50, and float-actuated supply valve 53. The apparatus is driven by a belt on the pulley 9 and the mandrel 10 is caused to rotate when the lever 19 is manipulated to throw in the clutch, this movement causing the cutters to rise to their operative position as is obvious from the drawings. The adhesive-applying roll 26 is continuously driven and as a consequence always carries a fresh film of adhesive. When the operator is ready to produce a bucket body he starts the vacuum pump connected with the pipe 8 which creates a suction through the interior of the mandrel 10; then he places the end of the paper strip over the row of holes 11 and operates the lever 19 to throw in the clutch. The end of the blank or strip of material is held to the mandrel by the suction of the vacuum pump and as the mandrel rotates, the strip will be carried between the mandrel and the roll 26 and will be wrapped smoothly and evenly upon the mandrel receiving a coating of adhesive as it passes the roll 26. As the wound strip passes the cutters, its edges are trimmed so that the ends of the container will be regular and smooth. It will, of course, be understood that the container body is formed by a plurality of laminations wrapped about the mandrel, each lamination being pressed against the preceding lamination and held by the adhesive coating thereon. The weight 43 yieldably holds the roll 26 to the mandrel so that, as the thickness of the body increases, the slides 23 will recede and the roll will be retracted until the desired number of plies or laminations have been wrapped, sufficient pressure being exerted upon the material to effect a smooth even contact between the opposed surfaces of the laminations. We preferably employ an adhesive having glaze-forming qualities so that the coating applied to the last lamination will impart a good finish to the body.

The different plies or laminations may be formed from separate blanks or from blanks connected in a web and may be fed to the mandrel from or through a hopper 74 supported on the frame adjacent the mandrel.

After the bucket body is trimmed and completed, which may be after one complete revolution of the mandrel or at the end of any number of complete revolutions, the vacuum is broken, and the operator applies pressure to the pedal 46 and thereby shifts the bar 33 to the position in which it will be engaged by the latch 35 and the roll, consequently, held retracted while the bucket body is being removed. The bucket body is then released from the mandrel 10 by pressure on the pedal 70 which operates the yoke 66 to push the bucket body endwise. The bucket body is then ready to have the ends and top applied thereto.

We claim:

1. The combination of a mandrel, a shaft carrying the mandrel, a driving pulley loose on the shaft, a clutch slidable on the shaft but constrained to rotate therewith and adapted to engage the driving pulley, said clutch being provided with a longitudinal peripheral recess opening through its end remote from the driving pulley, means for shifting the clutch, and a fixed member bearing against the end of the clutch and preventing endwise movement of the same except when the recess is alined with said member and the mandrel is in a predetermined position.

2. The combination of a mandrel around which a blank is wrapped by rotation of the mandrel, an adhesive applying roller adapted to bear upon the blank wrapped around the mandrel, means for withdrawing the roller from the mandrel, said means being arranged to normally hold the roller to the mandrel, means for holding the roller withdrawn from the mandrel, and means operable upon rotation of the mandrel to release said holding means.

3. The combination of a mandrel around which a blank is wrapped by rotation of the mandrel, an adhesive-applying roller adapted to bear upon the blank wrapped around the mandrel, means for moving said roller to and from the mandrel, an ejector arranged adjacent one end of the mandrel to bear upon one edge of the wrapped blank, and means for actuating the ejector whereby to remove the wrapped blank from the mandrel.

4. The combination of a mandrel around which a blank is wrapped by rotation of the mandrel, an adhesive-applying roll mounted for sliding movement toward and from the mandrel in the plane of the axis of the mandrel, positively driven means for simultaneously rotating the mandrel and the roll, and means for withdrawing the roll from the mandrel, said means being arranged to yieldably hold the roll to the mandrel.

5. The combination of a main frame, a mandrel mounted for rotation thereon, slides supported on said frame, a pan supported on the frame between the slides, an adhesive-applying roller carried by the slides and adapted to transfer adhesive from the pan to a blank wrapped about the mandrel, and means connected with the slides for shifting the roller toward and from the mandrel.

6. The combination of a mandrel, a roller coöperating with the mandrel to press a blank thereto and apply adhesive to the blank, cutters arranged adjacent the ends of the mandrel and below the same, and means for raising and lowering the cutters.

7. The combination of a mandrel, a rock shaft supported below the mandrel, a yoke pivotally supported at the rear of the mandrel, operative connections between the rock shaft and the yoke, and cutters carried by the yoke adjacent the ends of the mandrel.

8. The combination of a mandrel about which a blank is wrapped by rotation of the mandrel, a presser roller arranged to bear upon the blank wrapped about the mandrel and apply adhesive thereto during the wrapping operation, a yoke mounted adjacent one end of the mandrel, and means for moving said yoke toward the mandrel whereby to engage the edge of the wrapped blank and push the same from the mandrel.

9. The combination of a mandrel mounted for rotation in a fixed bearing, a roller arranged adjacent the mandrel to bear upon a blank wrapped around the same and apply adhesive thereto, slides carrying the said roller, a bar connecting the said slides, a latch adapted to engage said bar, and means controlled by the mandrel driving means to release said latch.

In testimony whereof we affix our signatures.

ALEXANDER H. SEARLE. [L. S.]
OSCAR DURYEA. [L. S.]